Figure 1:
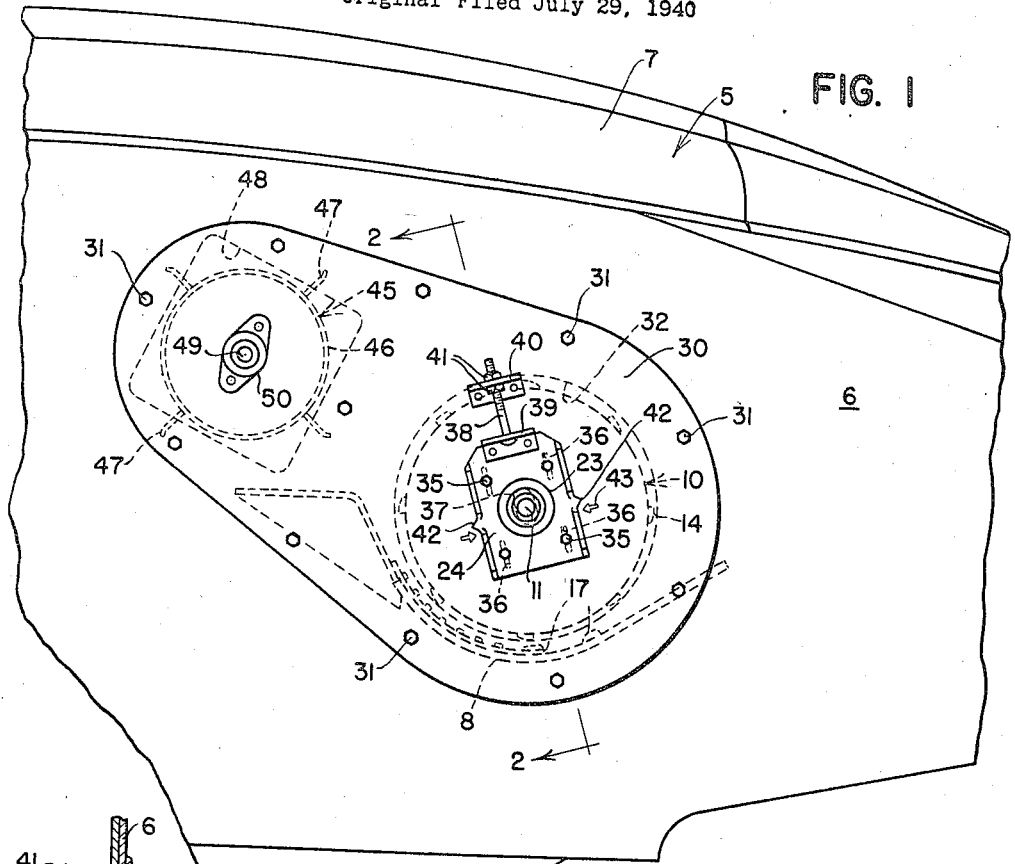

May 4, 1943.  R. L. ANDERSON ET AL  2,318,188

HARVESTING MACHINE

Original Filed July 29, 1940

INVENTORS:
RALPH L. ANDERSON
CHESTER RAY ARNOLD
BY
ATTORNEYS

Patented May 4, 1943

2,318,188

UNITED STATES PATENT OFFICE

2,318,188

HARVESTING MACHINE

Ralph L. Anderson and Chester Ray Arnold, Moline, Ill., assignors to Deere & Company, Moline, Ill., a corporation of Illinois Original application July 29, 1940, Serial No. 348,128. Divided and this application October 29, 1941, Serial No. 416,937

6 Claims. (Cl. 130—27)

The present invention relates to harvesting machines, with particular reference to machines of the type comprising a main body housing, within which is disposed a rotating threshing cylinder cooperative with a concave for the purpose of threshing grain from straw. The principal object of our invention relates to the provision of novel and improved means for mounting the cylinder and other parts of the threshing mechanism in the body of the machine, with provision for readily removing the cylinder or other parts through the side of the housing with a minimum of labor. Another object has to do with the provision of means for easily adjusting the threshing cylinder relative to the concaves so that this adjustment can be made quickly in the field. A further object relates to the provision of a novel rubber bearing mounting for the threshing cylinder.

This application is a division of an application, Serial No. 348,128, filed July 29, 1940, by Ralph L. Anderson, Chester Ray Arnold and Louis A. Paradise.

These and other objects and advantages of our invention will be apparent after a consideration of the following description, in which reference is had to the drawing appended hereto, in which—

Figure 2:
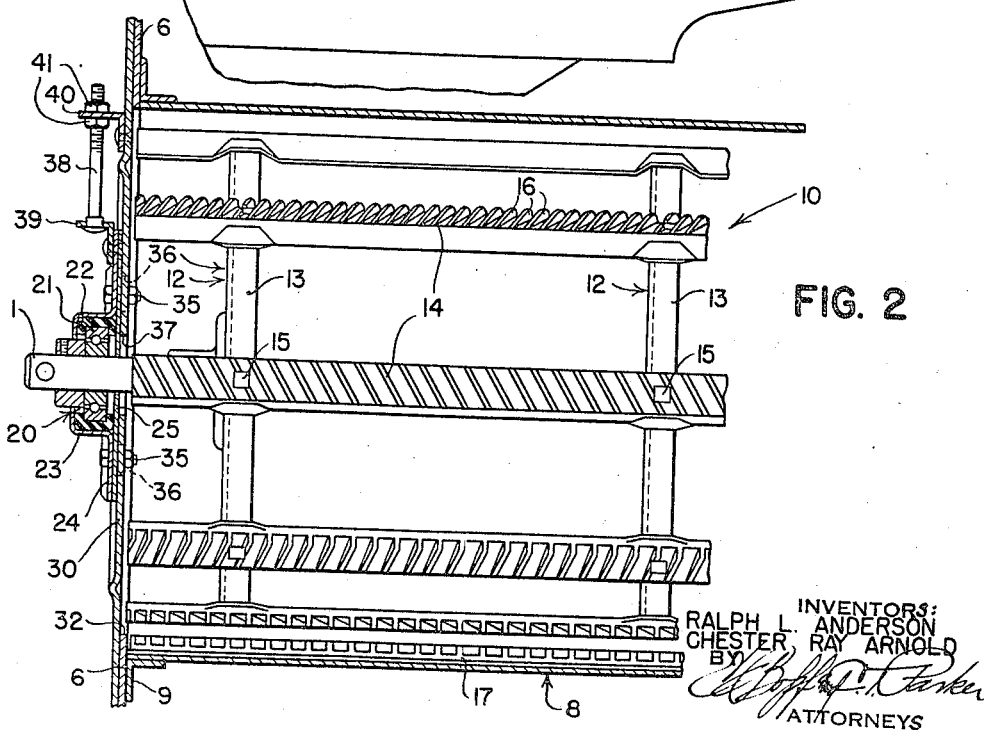

Figure 1 is a fragmentary side elevational view of a harvesting machine embodying the principles of the present invention; and Figure 2 is a sectional elevational view taken along a line 2—2 in Figure 1 and drawn to an enlarged scale.

Referring now to the drawing, reference numeral 5 indicates in its entirety the body of the harvesting machine, which includes a pair of longitudinally disposed laterally spaced vertical side walls 6 and an arched roof 7. Disposed within the body 5 is a threshing mechanism including a more or less conventional concave 8 supported on suitable brackets 9 on the side walls 6 of the body, and a threshing cylinder 10 disposed in cooperative relation thereto.

The threshing cylinder 10 comprises a supporting shaft 11 on which is mounted a plurality of laterally spaced sheet metal disks 12, the outer edges of which are turned to provide supporting flanges 13 upon which are mounted a plurality of rasp bars 14 connected to the flanges 13 by bolts 15 in a manner well-known to those skilled in the art. The bars 14 are provided with the usual obliquely disposed corrugations 16 for rubbing the kernels of grain from the stalks in cooperation with similar rub bars 17 on the concave 8. Each end of the supporting shaft 11 of the threshing cylinder is journaled in a bearing 20 of the anti-friction type, the outer race 21 of which is embraced by an annular rubber rim 22, which surrounds the outer race 21 and is supported in a cup-shaped bearing housing 23 which tightly embraces the rubber rim 22 and opposes the latter against rotation.

The cup-shaped housing 23 is supported on a plate 24, which is attached to an inner retaining plate 25 which lies against the inner surface of the plate 24 and extends beyond the annular rubber rim 22 to hold the latter within the cup-shaped housing 23.

The bearing housing is mounted on a large cover plate 30, which is connected by means of bolts 31 to the side wall 6 of the body 5, to cover an opening 32 in the wall 6, which is large enough to permit the threshing cylinder 10 to be inserted therethrough during installation of the cylinder or which may be readily removed from the body by withdrawing it axially through the opening 32 after the cover plate 30 has been removed.

In order to provide an adjustment of the clearance between the threshing cylinder and the concave bars, the bearing housing 23 is mounted on the cover plate 30 by means providing for shifting the bearing housing on the cover plate. The bearing is secured to the cover plate by means of a plurality of bolts 35 which extend through aligned apertures in the plates 24, 25 and through elongated slots 36 in the cover plate 30.

The cylinder shaft 11 extends outwardly through the cover plate 30 through an elongated slot 37 in the latter, which permits a limited amount of shifting movement of the shaft bearing relative to the cover plate in a plane which is tilted slightly rearwardly from the vertical. The purpose of the adjustment of the cylinder along a slanting plane is to provide an adjustment perpendicular to a cord drawn through the concave bars 17, the latter being spaced slightly forwardly of the vertical plane passing through the axis of the threshing cylinder. To facilitate adjustment of the cylinder bearing housing 23, an adjusting bolt 38 engages an angular clip 39 rigidly connected, as by rivets, to the bearing housing plates 24, 25, and extends upwardly therefrom to a second clip 40 which is riveted to the cover plate 30. A pair of lock nuts 41 engage the bolt 38 on opposite sides of the clip 40 for rigidly fixing the bolt in adjusted position.

In order to obtain a visual indication of the cylinder clearance, an indicator 42 is provided on the edge of the bearing plate 24 and a mark 43 is provided on the cover plate 30 to indicate the position of the indicator 42 at the position of minimum clearance of the cylinder.

A similar adjustment is provided for the bearing at the other end of the cylinder shaft, but it is not considered necessary to describe the other bearing since the details are identical to those shown and described above, with the exception that the bearing is adjustably mounted directly upon the side wall 6 of the main housing, as there is no enlarged opening in that wall for removing the cylinder from that side and thus there is no necessity for a cover plate similar to the cover plate 30.

A beater or separating cylinder 45 is mounted for rotation about an axis spaced rearwardly and upwardly from the axis of rotation of the threshing cylinder 10 and comprises an imperforate cylindrical rotor 46 upon which are mounted a plurality of outwardly extending fingers or pegs 47, which pass closely adjacent to the bars 14 of the cylinder 10 for the purpose of stripping off any harvested material that tends to cling thereto and to pass the same rearwardly to the straw rack or other separating mechanism of the harvester (not shown). In order to facilitate installation and removal of the beater 45, an enlarged opening 48 is provided in the side wall 6 of the body 5, through which the beater can be inserted or withdrawn axially from the body. This opening 48 is preferably made square, as shown in Figure 1, and of such dimensions that the fingers 47 will pass through the corners of the opening when the cylinder is withdrawn therethrough. The separating cylinder 45 is mounted on a shaft 49, which is journaled in a bearing 50 which is fixedly supported on the cover plate 30, the latter being elongated upwardly and rearwardly to cover both of the openings 32, 48 in the side wall 6 of the body. No adjustment is necessary for the shaft of the beater, however, inasmuch as the clearance between the beater fingers 47 and the cylinder bars 14 is not greatly changed by the adjustment of the threshing cylinder. Obviously, however, if so desired, the bearing 50 can be mounted on a shiftable plate similar to the plate 24 on which the threshing cylinder bearing 23 is mounted.

We claim:

1. In a harvesting machine having a body, a rotatable crop engaging device including a supporting shaft, a supporting bearing for said shaft, said body having an opening in one side large enough to receive said rotatable device during installation and removal thereof, a cover plate for said opening and having an opening larger than said shaft to receive the latter, means for fixing said cover plate to said body over said opening, and means for mounting said bearing on said cover plate comprising a second plate attached to said bearing and disposed over the opening in said cover plate, said second plate being slidable on said cover plate throughout a range in which said second plate provides a closure for said cover plate opening, and means for fixing said second plate to said cover plate in adjusted position.

2. In a harvester having a body, a threshing cylinder including a supporting shaft, said body having an opening in one side adapted for insertion of said cylinder axially therethrough during installation or removal thereof, a cover plate for said opening, means for detachably fixing said cover plate to said body over said opening, said cover plate having an opening larger than said shaft to receive the latter, a pair of inner and outer annular coacting bearing members supporting said shaft, an annular rubber rim embracing said outer bearing member, a cup-shaped housing tightly embracing said rubber rim, and means for adjustably fixing said cup-shaped housing to said cover plate in any of several positions of vertical adjustment on the plate, including a second plate attached to said cup-shaped housing and slidable over the opening in said cover plate throughout a limited range in which said second plate provides a closure for said cover plate opening, and means for fixing said second plate to said cover plate in adjusted position.

3. In a harvester having a body, a threshing cylinder including a supporting shaft, said body having an opening in one side adapted for insertion of said cylinder axially therethrough during installation or removal thereof, a cover plate for said opening, means for detachably fixing said cover plate to said body over said opening, a pair of inner and outer annular coacting bearing members supporting said shaft, an annular rubber rim embracing said outer bearing member, a cup-shaped housing tightly embracing said rubber rim, and means for adjustably fixing said cup-shaped housing to said cover plate in any of several positions of vertical adjustment on the plate, including a second plate attached to said cup-shaped housing and slidable on said cover plate, guide means for guiding the movement of said second plate on said cover plate, and an adjusting bolt engaging said second plate and said cover plate for adjusting the relative positions of the plates.

4. In a harvesting machine having a body, a threshing cylinder and a separating cylinder disposed adjacent each other therein, a side of said body having a pair of adjacent apertures adapted to receive said threshing cylinder and said separating cylinder, respectively, axially therethrough during installation or removal of the cylinders, an elongated cover plate adapted to extend over and cover both of said apertures, means for detachably fixing said cover plate on said body, and bearing means supported on said plate in register with each of said apertures for rotatably supporting said cylinders.

5. The combination set forth in claim 4, including the further provision of means for shifting one of said bearings relative to the other, comprising a second plate attached to one of said bearings and slidable on said cover plate, and means for fixing said plates together in adjusted position.

6. In a harvesting machine having a body, a threshing cylinder including a supporting shaft, a supporting bearing for said shaft, said body having an opening in one side adapted for insertion of said cylinder axially therethrough during installation or removal thereof, a cover plate for said opening, means for detachably fixing said cover plate to said body over said opening, said cover plate having an opening therein larger than said shaft to receive the latter, and means for mounting said bearing on the outside of said plate providing for shifting said shaft on said plate, said mounting means including a second plate attached to said bearing and slidable on said cover plate over the shaft receiving opening therein, guide means for guiding the movement of said second plate on said cover plate, and an adjusting bolt engaging said second plate and said cover plate for adjusting said bearing relative to said cover plate.

RALPH L. ANDERSON.
CHESTER RAY ARNOLD.